United States Patent [19]

Taylor

[11] Patent Number: 4,915,831
[45] Date of Patent: Apr. 10, 1990

[54] FILTER ASSEMBLY FEATURING DISPLACEABLE FILTER HEAD PLUNGER FOR LOCKING INTO FILTER CARTRIDGE DETENT

[75] Inventor: Bruce Taylor, Kensington, Conn.
[73] Assignee: Cuno, Incorporated, Meriden, Conn.
[21] Appl. No.: 300,575
[22] Filed: Jan. 23, 1989
[51] Int. Cl.$^4$ ............................................ B01D 27/08
[52] U.S. Cl. ..................... 210/232; 210/440; 210/443; 210/497.01; 210/DIG. 17; 55/490; 55/502; 55/504; 206/1.5; 215/216; 215/222; 215/287; 215/308
[58] Field of Search ................... 55/490, 502, 504; 210/232, 238, 440, 443, 444, 497.01, DIG. 17; 206/1.5; 215/214, 216, 220, 222, 308, 309, 287

[56] References Cited

U.S. PATENT DOCUMENTS

| | | | |
|---|---|---|---|
| 2,382,278 | 8/1945 | Widmann | 210/164 |
| 2,979,208 | 4/1961 | Humbert, Jr. | 210/232 |
| 3,319,791 | 5/1967 | Horne | 210/234 |
| 3,333,703 | 8/1967 | Scavuzzo et al. | 210/DIG. 17 |
| 3,358,839 | 12/1967 | Simons | 210/232 |
| 3,556,300 | 1/1971 | Codo | 210/234 |
| 3,746,171 | 7/1973 | Thomsen | 210/232 |
| 3,852,196 | 12/1974 | Szpur | 210/133 |
| 4,371,439 | 2/1983 | Thornton | 210/443 |
| 4,434,903 | 3/1984 | Cooke | 215/222 |
| 4,446,987 | 5/1984 | White | 215/287 |
| 4,617,118 | 10/1986 | Smart | 210/232 |
| 4,719,012 | 1/1988 | Groezinger et al. | 210/232 |
| 4,735,716 | 4/1988 | Petrucci et al. | 210/232 |
| 4,764,275 | 8/1988 | Robichaud | 210/232 |
| 4,806,240 | 2/1989 | Giordana et al. | 210/232 |

FOREIGN PATENT DOCUMENTS

| | | | |
|---|---|---|---|
| 678800 | 12/1964 | Italy | 210/DIG. 17 |
| 982548 | 2/1965 | United Kingdom | 210/DIG. 17 |

Primary Examiner—Richard V. Fisher
Assistant Examiner—Wanda L. Millard
Attorney, Agent, or Firm—Weingram & Zall

[57] ABSTRACT

According to the present invention, a locking means is provided for a filter cartridge and head unit. This locking means comprises a spring driven plunger, which preferably is supported by the head and comprises at least one detent, which preferably is disposed in the cartridge in the top wall upper surface thereof, whereby inadvertent disengagement of the cartridge from the head is prevented by engagement of the plunger and the detent, and whereby replacement of the cartridge is permitted by first lifting the plunger before rotating the cartridge through a requisite 90 degrees for disengagement thereof. By using the spring driven plunger and cooperating detent, the problem is avoided of a person, or a child, being able to inadvertently disengage the securing tabs from the securing tab receptacles. Also, in the case of the usual fluid dispensing machine where the head is fixedly attached to the underside of the dispensing machine, the problem of not having a suitable locking means is avoided and no special tools are required.

33 Claims, 5 Drawing Sheets

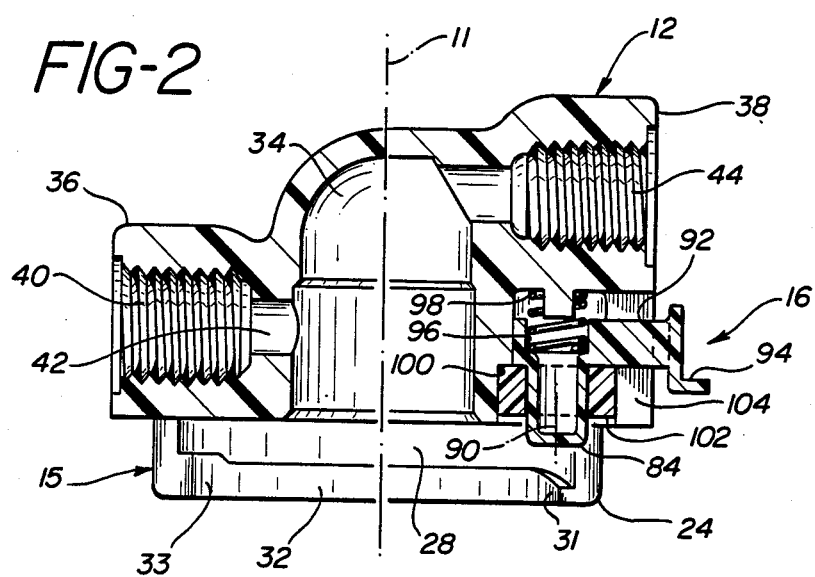
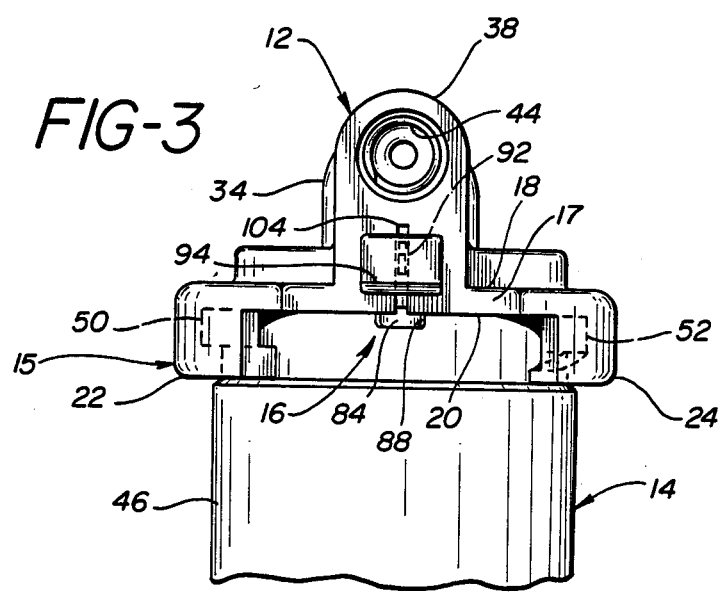

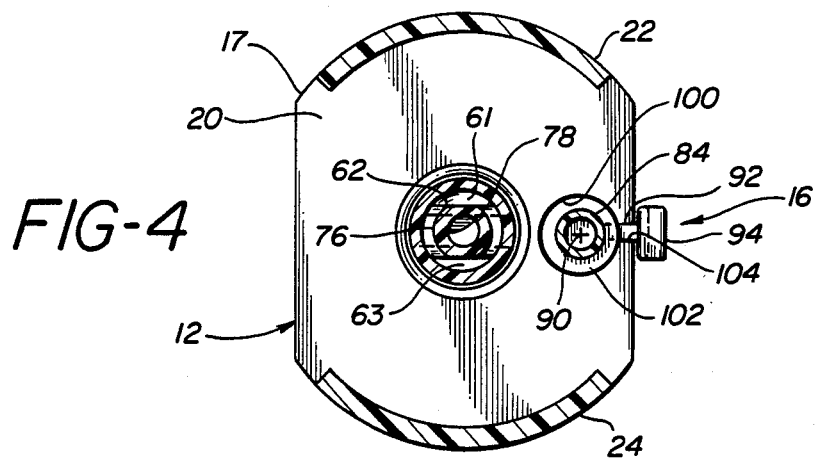
FIG-4
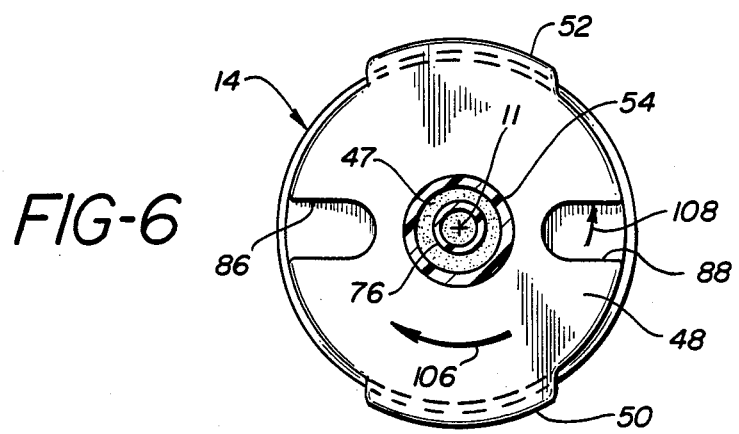
FIG-5
FIG-6

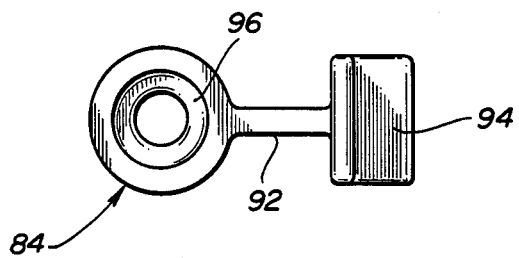
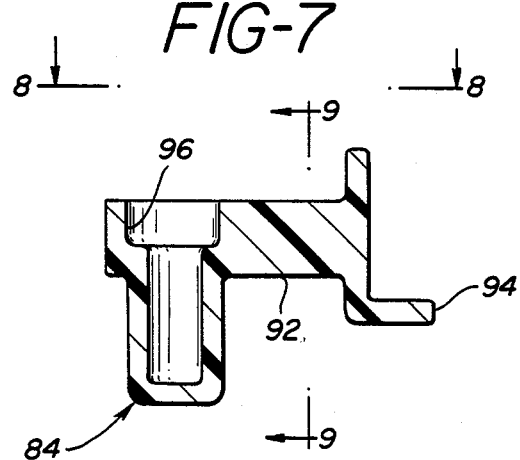
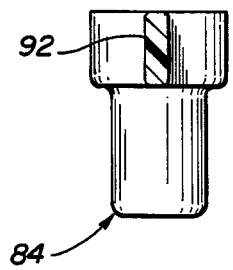

FILTER ASSEMBLY FEATURING DISPLACEABLE FILTER HEAD PLUNGER FOR LOCKING INTO FILTER CARTRIDGE DETENT

The present invention relates to a filter cartridge and head unit, and in particular to a filter cartridge and head unit having a securing means for securing the cartridge to the head unit and a locking means for preventing removal of the cartridge from the head.

BACKGROUND OF THE INVENTION

A particularly preferred prior art filter cartridge and head unit is described in U.S. Pat. No. 4,735,716 to Petrucci et al, which is assigned to the same assignee as this application. This prior art filter cartridge and head unit includes a head, a cartridge, and securing means which secures the cartridge to the head. The head has a circular flat plate, which has an inlet port with an inlet passage, and which has an outlet port with an outlet passage. The cartridge has a housing, which has a cavity that contains filtering material, in order to pass a fluid from the inlet port, through the inlet passage, through the filtering material, and through the outlet passage to the outlet port. The securing means includes a pair of opposite tab receptacles, which are fixedly connected to the flat plate of the head and a pair of opposite tabs, which are fixedly connected to the housing which engage the respective tab receptacles by rotating the cartridge in one direction through 90 degrees and which disengage the respective tab receptacles by rotating the cartridge in an opposite direction through 90 degrees.

Related prior art patents include U.S. Pat. Nos:
3,852,196, to Szpur;
3,746,171, to Thomsen;
3,556,300, to Codo;
3,358,839, to Simons;
3,319,791, to Horne;
2,979,208, to Humbert: and
2,382,278, to Widmann.

U.S. Pat. No. 3,852,196 to Szpur describes a head, a cartridge and securing means. The head has a valve body, which has an inlet port with an inlet passage, and which has an outlet port with an outlet passage. The cartridge has a housing, which has a chamber that contains filtering material. The securing means includes an inner tubular portion, which is fixedly connected to the head and which has an exterior thread, and includes an outer tubular portion, which is fixedly connected to the cartridge, and which has an interior thread for engaging the exterior thread.

U.S. Pat. No. 3,746,171 to Thomsen describes a head, a cartridge, and securing means. The head has an inlet passage and an outlet passage. The cartridge has a housing which has a chamber that holds the filtering material. The securing means includes interacting cam portions.

U.S. Pat. No. 3,556,300 to Codo describes a head, a housing unit and securing means. The head has an elongate bolt disposed along a common axis of the head and housing. The housing has an upper inlet port and a lower outlet port. The housing and a filtering unit are mounted on the elongate bolt. The filtering unit is an annular unit forming an annular inlet chamber, and a central outlet chamber connecting to the outlet port. The annular filtering unit is supported on a cotter pin, which fits in a slot in the elongate bolt.

U.S. Pat. No. 3,358,839 to Simons describes a head or cap, a cartridge or elongate body, and securing means. The head has an outlet. The cartridge has a chamber, which contains a filtering sleeve, that has a top portion attached to the head. The securing means includes a pair of ridges which are fixedly connected to the head, and includes a pair of ridges with respective cam surfaces which are fixedly connected to the cartridge.

U.S. Pat. No. 3,319,791 to Horne describes a head, a cartridge and securing means. The head has an inlet port and an inlet passage, and has an outlet port and an outlet passage. The cartridge has a chamber which contains filtering material. The securing means includes a tubular portion, which is fixedly connected to the head and which contains an internal thread, and includes a stem portion, which is fixedly connected to the cartridge and which has an exterior thread for engagement with the interior thread.

U.S. Pat. No. 2,979,208 to Humbert describes a head, a cartridge, and a securing means. The head has an inlet port and an outlet passage. The cartridge has a chamber, which has an annular filtering element, that forms an outer annular space connecting to the inlet passage and forms an inner space connecting to the outlet passage. The securing means includes a tubular lower portion, which is fixedly connected to the head and which has an exterior thread, and includes a ring portion which is fixedly connected to the cartridge and which has an interior thread for engagement with the exterior thread. The tubular lower portion has a locking screw which has an end portion that bears against the ring portion when the screw is rotated clockwise, in order to prevent unscrewing the cartridge from the head.

U.S. Pat. No. 2,382,278 to Widmann describes a head, a cartridge and securing means. The head has an inlet port and an inlet passage, and has an outlet port and an outlet passage. The cartridge has a chamber, which contains an annular filtering element that forms an outer annular space connecting to the inlet passage, and forms an inner space connecting to the outlet passage. The securing means includes a tubular lower portion, which is fixedly connected to the head and which has an interior thread, and includes a ring portion, which is fixedly connected to the cartridge and which has an exterior thread for engagement with the interior thread. The tubular lower portion has an ear portion with a first hole and the ring portion has a portion with a second hole, and a locking wire extends through the first hole and the second hole in order to prevent unscrewing the cartridge from the head.

One problem with the prior art filter cartridges and head units is that it is possible for a person, or a child, to rotate the filter cartridge relative to the head. This will cause the securing tabs of the cartridge to disengage from the securing tab receptacles of the head causing the filter to be driven out of the head by the normal line pressure, thereby allowing the escape of fluid under pressure. In the case of the usual fluid dispensing machine, where the head is fixedly attached to the underside of the dispensing machine, or the like, a securing means which requires a locking wire or locking screw, also requires special tools and is not easily accessible.

SUMMARY OF THE INVENTION

According to the present invention, a locking means is provided for a filter cartridge and head unit. This locking means comprises a spring driven plunger, which preferably is supported by the head and comprises at least one detent, which preferably is disposed in the cartridge in the top wall upper surface thereof, whereby inadvertent disengagement of the cartridge from the head is prevented by engagement of the plunger and the detent, and whereby replacement of the cartridge is permitted by first lifting the plunger before rotating the cartridge through a requisite 90 degrees for disengagement thereof.

By using the spring driven plunger and cooperating detent, the problem is avoided of a person, or a child, being able to inadvertently disengage the securing tabs from the securing tab receptacles. Also, in the case of the usual fluid dispensing machine where the head is fixedly attached to the underside of the dispensing machine, the problem of not having a suitable locking means is avoided and no special tools are required.

More specifically, a filter unit is provided for filtering a fluid, such as water in a dispensing machine. The filter unit includes a head, which is fixedly connected to the machine, a twist-on cartridge, which contains a filtering material and which is easily replaceable, securing means, which connects the cartridge to the head, and lock means, which prevents untwisting of the cartridge from a locked position. The head has an inlet port and an inlet passage, and has an outlet port and an outlet passage. The cartridge has a cavity, which contains filtering material and which connects to the inlet passage and to the outlet passage for filtering the fluid. The securing means includes a pair of diametrically opposite tab receptacles, which have respective cam surfaces and which are fixedly connected to the head, and includes a pair of tabs, which are diametrically opposite and which are fixedly connected to the cartridge. The lock means includes a plunger, which is received in a hole in the head, and includes two diametrically opposite detents, each of which can receive the plunger in its locked position. The plunger is disposed, in a peripheral direction, midway between the tab receptacles on the head. The detents are each disposed, in a peripheral direction, midway between the tabs on the cartridge. The plunger has a helical spring, which urges the plunger toward its closed position for engagement with one of the detents. The plunger has an extension, which is disposed in a vertical slot in the head and which has a finger tab for lifting the plunger to an open position.

The foregoing and other objects, features and advantages will be apparent from the following description of the preferred embodiment of the invention as illustrated in the accompanying drawings.

BRIEF DESCRIPTION OF THE DRAWINGS

FIG. 2 is an enlarged view of a portion of FIG. 1A;

FIG. 3 is a side elevational view as taken along the view line 3—3 of FIG. 1A;

FIG. 4 is a section view as taken along the line 4—4 of FIG. 1A;

FIG. 5 is a section view as taken along the line 5—5 of FIG. 1A;

FIG. 6 is a section view as taken along the line 6—6 of FIG. 1A;

FIG. 7 is a detail view of a portion of FIG. 1A;

FIG. 8 is a top plan view as taken along the view line 8—8 of FIG. 7; and

FIG. 9 is a section view as taken along the line 9—9 of FIG. 7.

DESCRIPTION OF THE PREFERRED EMBODIMENT

Figure 1:
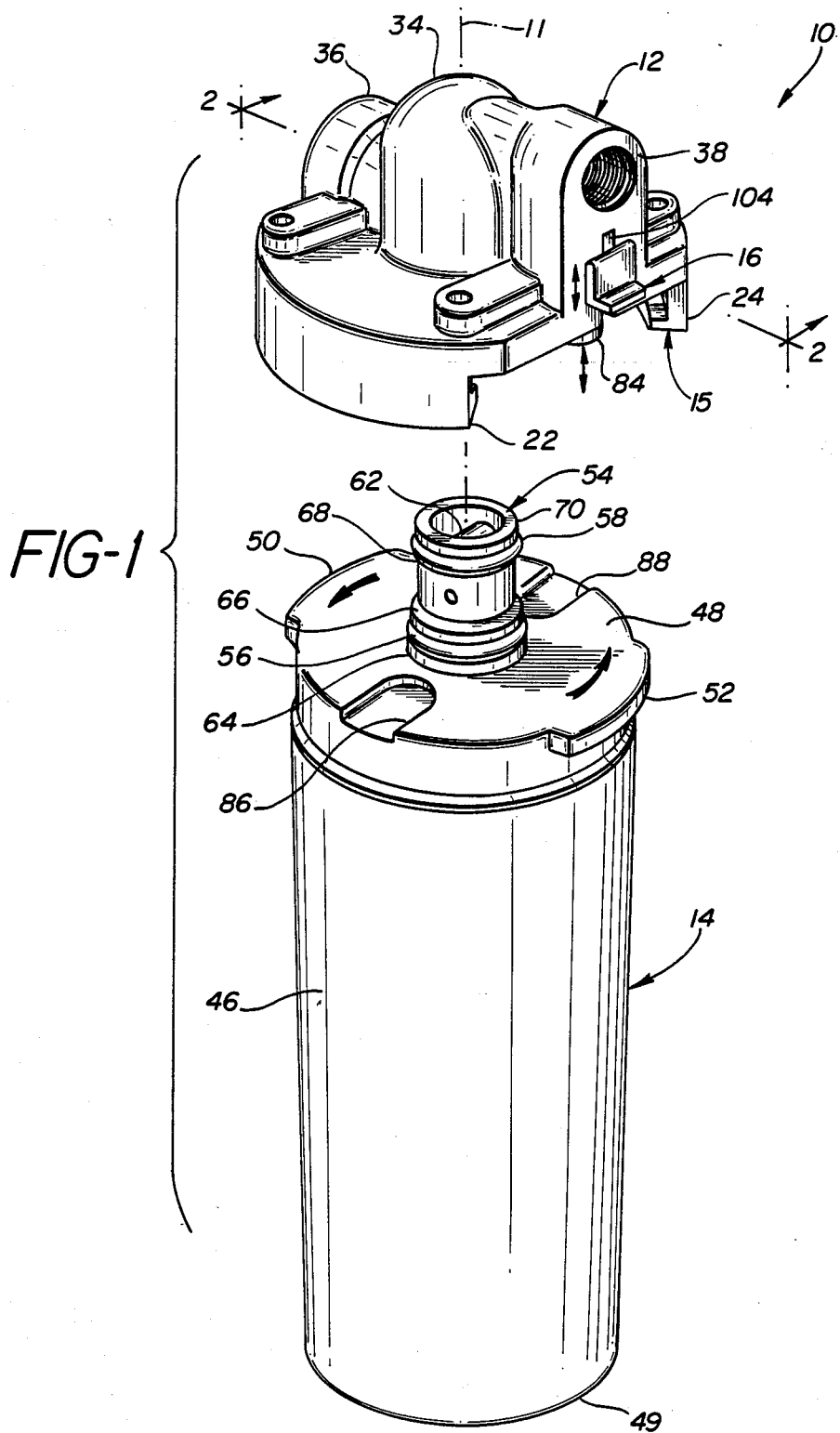
FIG. 1 is an exploded perspective view of a filter cartridge and head unit according to the present invention.

As shown in FIGS. 1, 1A, 2 and 5, a filter unit 10, which has an axis 11, is provided. Filter unit 10 includes a head 12, a cartridge or canister 14, which is disposable and which is a twist-on type of cartridge, a securing means 15, and a lock means 16.

The construction of head 12 and cartridge 14 and securing means 15 are preferably the same construction as, or similar to, that shown in U.S. Pat. No. 4,735,716, to Petrucci et al, which is assigned to the same assignee as this application, and which is incorporated herein by reference.

As shown, for example, in FIGS. 3 and 5, head 12 has a circular flat plate 17, which has a top surface 18 and a bottom surface 20. Securing means 15 includes two tab receptacles 22, 24, which are fixedly connected to head 12 and which secure cartridge 14 to head 12. Receptacles 22, 24 have respective upstanding arcuate walls 26, 28, which have respective reentrant cam walls 30, 32. Receptacle 22 is identical in construction to receptacle 24.

As shown in FIG. 2, the thickness of wall 32 at one end 31 is narrower than its other end 33, in order to provide a tapered cam surface. The increased thickness at end 33 acts as a stop block, in order to prevent cartridge 14 from rotating more than 90 degrees. Referring to FIG. 1, cartridge 14 is secured to head 12 by rotating cartridge 14 in a clockwise direction through an angle of about 90 degrees.

Figure 1A:
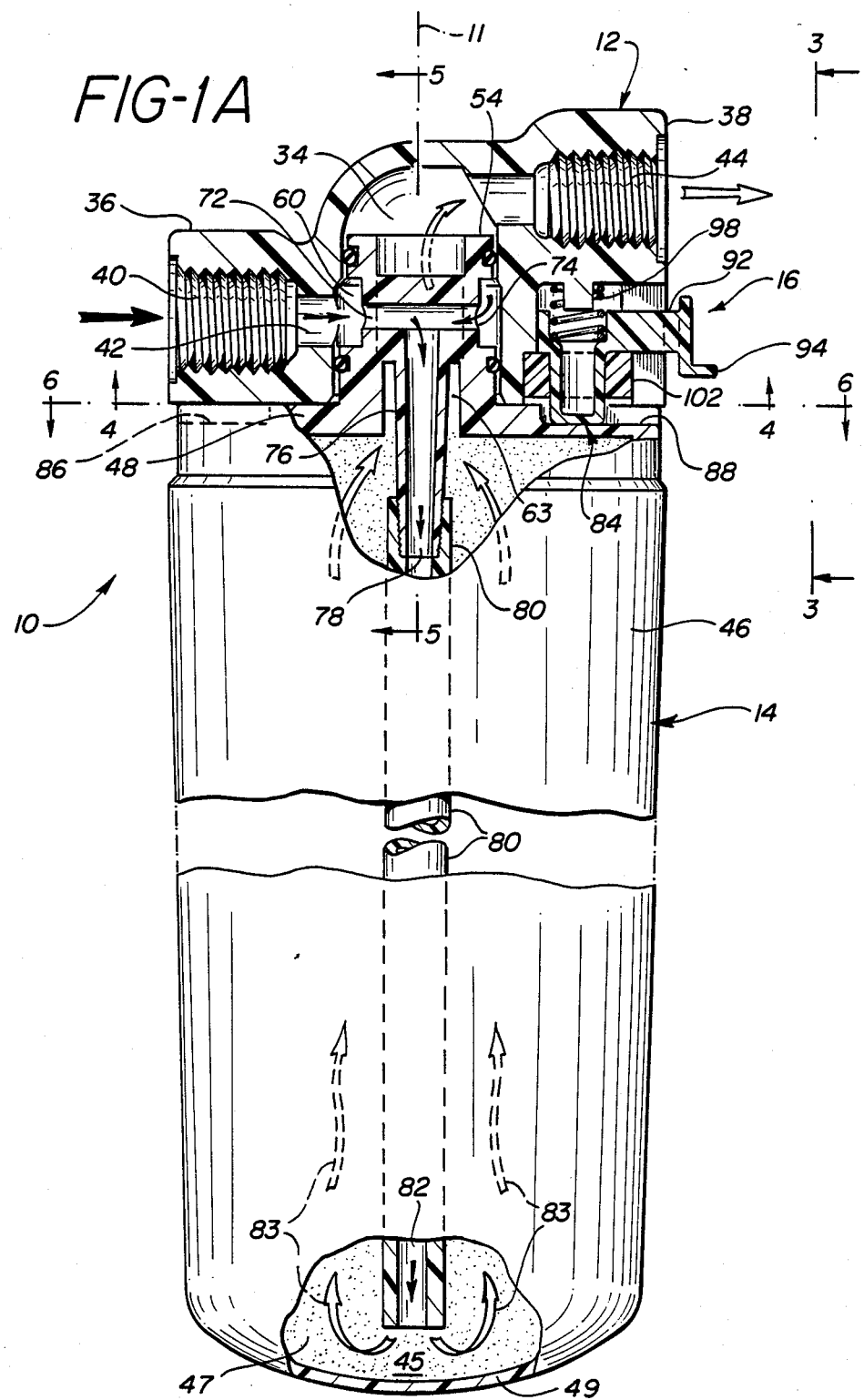
FIG. 1A is an elevation view and a partial section view of the filter cartridge and head unit taken along 1A—1A of FIG. 1.

As shown in FIG. 1A, head 12 has an upstanding or vertical chamber 34, which has an inlet port 36 and an outlet nozzle or port 38. Inlet port 36 has a threaded opening 40 and a reduced diameter passage 42, which communicates with chamber 34. Outlet port 38 also has a threaded opening 44, which communicates with chamber 34.

Referring to FIGS. 1 and 1A, cartridge 14 has a main housing 46 of cylindrical shape, which has a cavity or chamber 45 that contains a filtering material or unit 47, such as activated carbon material for filtering a fluid, such as water for a dispensing machine. Cartridge 14 has a top wall 48 and a bottom wall 49. Top wall 48 has a pair of diametrically opposite tabs 50, 52, which project radially outwardly therefrom, and which are received by respective receptacles 22, 24, thereby connecting or securing the cartridge 14 to head 12. Top wall 48 has a neck 54, which projects upwardly therefrom. Neck 54 supports, on the exterior thereof, a lower O-ring seal 56 and an upper O-ring seal 58. Seals 56, 58 form an annular or circular passage 60 therebetween.

Neck 54 supports, on the inner side thereof, a tee-shaped member 62. Neck 54 has two inner passages 61, 63 between which tee-shaped member 62 is disposed (see FIG. 4).

As shown in FIGS. 1 and 1A, neck 54 also has two lower radial projections 64, 66, which have a groove therebetween that receives lower O-ring 56. Neck 54 also has two upper radial projections 68, 70, which have a groove therebetween that receives upper O-ring 58.

As shown in FIG. 1A, tee member 62 has two transverse inlet passages 72, 74, which connect to circular passage 60. Tee member 62 also has a stem 76, which has a vertical passage 78 that connects to transverse inlet passages 72, 74.

Fluid, such as water, enters passage 60, passes through passages 72, 74, then passes down through passage 78.

Stem 76, which has an exterior thread, is received in a tube 80, which has a vertical passage 82, and which extends to the bottom of cartridge 14 and filter material 47. Passage 82 empties into cavity 45 next to bottom wall 49. As shown by direction arrows 83, the fluid passes down through passage 82, then filters upwardly through filter material 47, then passes through passages 61 or 63, then passes through upper passage 34, and passes out through outlet opening 44 of outlet port 38.

According to the invention, as shown in FIGS. 1, 1A and 2, lock means 16 is provided in order to prevent a person, or a child, from being able to inadvertently rotate the filter cartridge 14 in the head 12 and possibly disengage the securing tabs 50, 52 from the securing tab receptacles 22, 24.

Lock means 16 includes a spring driven plunger 84, which is supported by head 12, and a pair of detents 86, 88, one of which is engaged by plunger 84. Detents 86, 88 are disposed in cartridge top wall 48 in the upper surface thereof. Plunger 84 has an axis 90, and plunger 84 is axially displaceable along axis 90.

The resultant engagement between plunger 84 and a detent 86 or 88 acts as a preventative to inadvertent disengagement of cartridge 14 from head 12. Cartridge 14 can be disengaged or removed from head 12 only by first lifting plunger 84, thereby permitting one to rotate cartridge 14 through the requisite 90 degree angle, and removing cartridge 14 from head 12.

Referring to FIGS. 2 and 7-9, plunger 84 has an extension 92, which has a finger tab 94 that is fixedly connected thereto. Finger tab 94 may be colored a bright red, to serve as a reminder to the user, that the fluid or water pressure must be shut off, and the line vented to avoid water escaping under pressure.

Plunger 84 has a spring recess 96, and a helical spring 98 which is received in recess 96. Head 12 has a hole 100, and a retainer ring 102, which is received in hole 100, with a pressure fit.

Referring to FIG. 3, head 12 also has a vertical slot 104, which receives extension 92, with a relatively loose fit or large clearance.

Ring 102 is composed of a selected plastic material, in order to minimize friction. Plunger 84 is composed of a selected plastic material for ease of molding. Plunger 84, including extension 92 and finger tab 94, can be a one-piece molded part.

When a twist-on torque is applied to cartridge 14, the cartridge 14 rotates through 90 degrees to an angular orientation, where lock plunger 84 snaps or moves into one of the detents 86 or 88. When a twist-off torque 106 is applied to cartridge 14 (FIG. 6), plunger 84 applies a shear force or reaction 108 to the detent 88 and prevents untwisting of the cartridge 14. Only when the user uses one hand to lift the plunger 84 and the other hand to untwist cartridge 14, can cartridge 14 be rotated and untwisted through a 90 degree angle and disengaged from head 12.

The advantages of this invention are:

a. Lock means 16 is not easily opened by a child, because one hand is required to raise plunger 84, while the other hand is required to rotate and remove cartridge 14 from head 12.

b. Lock means 16 is relatively easily closed, because an automatic locking action occurs upon completion of the approximate 90 degree turn of cartridge 14 relative to head 12 and provides a clicking noise, thereby providing a definite indication that the turn is completed and that the parts are locked.

c. Filter unit 10 is improved over the prior art unit because the securing means 15 always has the same angular orientation in the closed position of each detent. This also provides the same sealing pressure of cartridge top wall 48 against head lower surface 20 during continuous use and replacements.

d. Locking means 16 can withstand a relatively large shearing force passing from plunger 84 to detent 86 or 88.

e. Locking means 16 has a spring 98, which can have a spring rate chosen so that a child could not normally apply the selected, relatively large spring force for opening plunger 84.

f. A tool is not required by a user for opening locking means 16.

g. Locking means 16 is easily accessible to the user.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A filter cartridge and head unit comprising:
a head having an inlet passage and an outlet passage;
a cartridge having a cavity for filter material;
securing means for twisting the cartridge onto the head; and
locking means for preventing untwisting of the cartridge;
said locking means comprising:
a plunger being supported by the head and having an axis and being axially displaceable from an unlocked position to a locked position, and having a spring means engaging the head and urging the plunger to the locked position; and
a detent being disposed in a top wall surface of the cartridge and being coaxial with the plunger in the locked position when aligned therewith, the detent for receiving the plunger in a locked position and for receiving a shear force from the plunger occurring when the cartridge is subject to an untwisting torque.

2. The filter cartridge and head unit of claim 1, wherein the plunger has an extension extending radially outwardly therefrom for finger operation of the plunger.

3. The filter cartridge and head unit of claim 2, wherein the head has a hole disposed along the axis and has a retainer ring received in the hole coaxially therewith for guiding the plunger, and wherein the head has a slot receiving the extension.

4. A filter cartridge and head unit comprising:
a head having an inlet passage and an outlet passage;
a cartridge having a cavity for filter material;
securing means for twisting the cartridge onto the head; and
locking means for preventing untwisting of the cartridge; said locking means comprising:
a plunger; and
a detent for receiving the plunger;

wherein the plunger is supported by the head, and has an axis, and is axially displaceable from an unlocked position to a locked position; and wherein the plunger has a spring means engaging the head and urging the plunger to the locked position, and wherein the detent is disposed in a top wall surface of the cartridge and is coaxial with the plunger in the locked position when aligned therewith; and wherein the plunger has an extension extending radially outwardly therefrom for finger operation of the plunger; and wherein the head has a hole disposed along the axis of the plunger and has a retainer ring received in the hole coaxially therewith for guiding the plunger, and has a slot for guiding the extension.

5. A filter unit for filtering a fluid comprising:
a head for mounting on a support, the head having an inlet port with an inlet passage and an outlet port with an outlet passage;
a twist-on cartridge having a cavity for containing a filtering material for filtering the fluid, the cartridge being connected to the inlet passage and to the outlet passage for filtering the fluid through the filtering material;
securing means for connecting the cartridge to the head, the securing means having a pair of diametrically opposite tab receptacles, each tab receptacle having a cam surface, and each tab receptacle being fixedly attached to the head, and further having a pair of diametrically opposite tabs, each being fixedly attached to the cartridge; and
lock means for preventing untwisting of the cartridge from the head, wherein the lock means comprises:
a plunger being disposed in a hole in the head in a peripheral direction about an axis of symmetry of the head and midway between the tab receptacles on the head, the plunger having a helical spring which urges the plunger towards a locked position for engagement, and also having an extension disposed in a slot in the head, said extension having a finger tab for lifting the plunger to an unlocked position; and
at least one detent for receiving the plunger in the locked position, said at least one detent being disposed in the cartridge in a peripheral direction about an axis of symmetry of the cartridge and midway between the tabs on the cartridge.

6. The filter unit of claim 5, wherein the plunger has a spring recess for receiving the helical spring, and
wherein the head has a retainer ring disposed in the hole in the head, said ring receiving the plunger.

7. The filter unit of claim 6, wherein the plunger with the extension and the finger tab is a one-piece molded part, composed of a selected plastic material.

8. A filter unit comprising:
a head having securing means;
a twist-on hollow cartridge secured thereto; and
lock means comprising:
a spring driven plunger supported by the head; and
at least one detent disposed in a top wall outer surface of the cartridge, whereby inadvertent disengagement of the cartridge from the head is prevented by engagement of the plunger and the detent in a locked position.

9. A head unit for a filter cartridge comprising:
an inlet passage and an outlet passage;
securing means to enable twisting the cartridge onto the
head; and
locking means comprising:
a plunger adapted to be received in a detent wherein the plunger is supported by the head, and has an axis, and is axially displaceable from an unlocked position to a locked position, and
wherein the plunger has a spring means engaging the head and urging the plunger to the locked position, and
wherein the plunger has an extension extending radially outwardly therefrom for finger operation of the plunger, and
wherein the head has a hole disposed along the axis of the plunger and has a retainer ring received in the hole coaxially therewith for guiding the plunger, and has a slot for guiding the extension.

10. A head unit for a filter cartridge filtering a fluid comprising:
securing means for connecting a twist-on cartridge to the head, the securing means having a pair of diametrically opposite tab receptacles, each tab receptacle having a cam surface, and each tab receptacle being fixedly attached to the head; and
locking means for preventing untwisting of the cartridge from the head, wherein the locking means comprises:
a plunger being disposed in a hole in the head and adapted to be received in a detent disposed in the cartridge in a locked position, the plunger also being disposed in a peripheral direction about an axis of symmetry of the head and midway between the tab receptacles on the head, the plunger having a helical spring urging the plunger toward the locked position for engagement with the detent, and the plunger also having an extension disposed in a slot in the head, said extension having a finger tab for lifting the plunger to an unlocked position.

11. The head unit of claim 10, wherein the plunger has a spring recess for receiving the helical spring, and
wherein the head has a retainer ring disposed in the hole in the head, said ring receiving the plunger.

12. The head unit of claim 11, wherein the plunger with the extension and the finger tab is a one-piece molded part, composed of a selected plastic material.

13. A filter cartridge and head unit comprising:
a head having an inlet passage and an outlet passage;
a cartridge having a cavity for filter material;
securing means for twisting the cartridge onto the head; and
locking means for preventing untwisting of the cartridge;
said locking means comprising:
a plunger being displaceable on the head and having a locked position and an unlocked position; and
a detent for receiving the plunger in the locked position and providing a predetermined angular orientation and an automatic locking action to indicate completion of the twisting of the cartridge onto the head, and further for withstanding a substantial shear force from the plunger in the locked position occurring when the cartridge is subject to an untwisting torque, so that the filter cartridge can only be removed from the head by first lifting the plunger into the unlocked position.

14. The filter cartridge and head unit of claim 13, wherein the plunger has a spring means engaging the head and urging the plunger to the locked position, and wherein the detent is disposed in a wall surface of the cartridge and is aligned with the plunger in the locked position.

15. The filter cartridge and head unit of claim 14, wherein the plunger has an extension extending radially outwardly therefrom for finger operation of the plunger for lifting the plunger from the locked position to the unlocked position.

16. The filter cartridge and head unit of claim 13, wherein the plunger has an extension extending radially outwardly therefrom for finger operation of the plunger for placing the plunger in a locked position or an unlocked position.

17. A filter cartridge and head unit of claim 13, wherein the plunger is axially displaceable on the head in the locked position and unlocked positions.

18. The filter cartridge and head unit of claim 17, wherein the head has an inlet port with an inlet passage and has an outlet port with an outlet passage; and wherein the cartridge has a cavity for containing the filter material and is connected to the inlet passage and to the outlet passage for filtering the fluid through the filtering material.

19. The filter cartridge and head unit of claim 18, wherein the securing means comprises a pair of diametrically opposite tab receptacles, each tab receptacle having a cam surface, and each tab receptacle being fixedly attached to the head; and a pair of diametrically opposite tabs, each being fixedly attached to the cartridge.

20. The filter cartridge and head unit of claim 14, wherein the plunger is disposed in a peripheral direction about an axis of symmetry of the head and midway between the tab receptacles on the head, and wherein the detent is disposed in a peripheral direction about an axis of symmetry of the cartridge and midway between the tabs on the cartridge.

21. The filter cartridge and head unit of claim 20, wherein the plunger has a helical spring urging the plunger toward a locked position for engagement with the detent, and wherein the plunger has an extension disposed in a slot in the head, said extension having a finger tab for lifting the plunger to an unlocked position.

22. The filter cartridge and head unit of claim 21, wherein the plunger has a spring recess for receiving the helical spring, and wherein the head has a retainer ring disposed in the hole in the head, said ring receiving the plunger.

23. The filter cartridge and head unit of claim 22, wherein the plunger with the extension and the finger tab is a one-piece molded part, composed of a selected plastic material.

24. A filter unit for filtering a fluid comprising:
a head for mounting on a support;
a twist-on cartridge for containing a filtering material for filtering the fluid;
securing means for connecting the cartridge to the head; and
locking means for preventing untwisting of the cartridge from the head, wherein the lock means comprises:

a plunger disposed in a hole in the head, the plunger having a helical spring urging the plunger toward a locked position for engagement; and at least one detent disposed in the cartridge for receiving the plunger in the locked position.

25. The filter unit of claim 24 wherein the plunger has a spring recess for receiving the helical spring, and wherein the head has a retainer ring disposed in the hole in the head, said ring receiving the plunger.

26. A head unit for a filter cartridge filtering a fluid comprising:
an inlet passage and an outlet passage;
securing means for connecting a twist-on cartridge to the head; and
lock means for preventing untwisting of the cartridge from the head, wherein the lock means comprises:

a plunger being supported by the head and disposed in a hole in the head, said plunger being displaceable from an unlocked position to a locked position and adapted to be received in a detent disposed in the cartridge when in the locked position so that the filter can only be removed from the head only by first lifting the plunger into the unlocked position.

27. The head unit of claim 26 wherein the securing means includes a pair of diametrically opposite tab receptacles, each tab receptacle having a cam surface, and each tab receptacle being fixedly attached to the head.

28. The head unit of claim 3, wherein the plunger is disposed in a peripheral direction about an axis of symmetry of the head and midway between the tab receptacles on the head.

29. The head unit of claim 28, wherein the plunger has a helical spring urging the plunger toward a locked position for engagement with the detent, and wherein the plunger has an extension disposed in a slot in the head, said extension having a finger tab for lifting the plunger to an unlocked position.

30. The head unit of claim 29, wherein the plunger has a spring recess for receiving the helical spring, and wherein the head has a retainer ring disposed in the hole in the head, said ring receiving the plunger.

31. The head unit of claim 30, wherein the plunger with the extension and the finger tab is a one-piece molded part, composed of a selected plastic material.

32. A head unit for a filter cartridge filtering a fluid comprising:
securing means for connecting a twist-on cartridge to the head; and
locking means for preventing untwisting of the cartridge from the head, wherein the locking means comprises:

a plunger disposed in a hole in the head adapted to be received in a detent disposed in the cartridge in a locked position, the plunger having a helical spring urging the plunger toward a locked position for engagement with the detent, and the plunger has an extension disposed in a slot in the head, said extension having a finger tab for lifting the plunger to an unlocked position.

33. The head unit of claim 32, wherein the plunger has an extension extending radially outwardly therefrom for finger operation of the plunger into the locked and unlocked position.

* * * * *